United States Patent [19]

Genzel et al.

[11] Patent Number: 5,576,961

[45] Date of Patent: Nov. 19, 1996

[54] PROCEDURE FOR CONTROLLING A MOTOR VEHICLE DRIVE UNIT

[75] Inventors: Michael Genzel, Rosstal; Rodolfo Möller, Nürnberg; Armin Tonn, Roth; Willem Kuster, Ingolstadt; Andreas Leicht, Gaimersheim, all of Germany

[73] Assignee: Temic Telefunken microelectronic GmbH, Heilbronn, Germany

[21] Appl. No.: 354,825

[22] Filed: Dec. 8, 1994

[30] Foreign Application Priority Data

Dec. 10, 1993 [DE] Germany ............... 43 42 204.7

[51] Int. Cl.$^6$ ................................................. G06G 7/70
[52] U.S. Cl. .................. 364/431.03; 364/431.02; 364/431.01; 364/551.01; 123/198 D; 123/333; 123/335
[58] Field of Search ............... 364/424.1, 424.01, 364/426.01, 426.02, 431.01–431.04, 551.01; 477/120, 129, 904, 155, 32, 43, 107, 905; 123/478, 480, 487, 488, 363, 350, 360, 369, 198 D, 333, 335; 73/116

[56] References Cited

U.S. PATENT DOCUMENTS

| | | | |
|---|---|---|---|
| 4,215,412 | 7/1980 | Bernier et al. | 364/431.02 |
| 4,551,803 | 11/1985 | Hosaka et al. | 364/431.05 |
| 4,870,585 | 9/1989 | Manzolini | 364/431.03 |
| 5,018,069 | 5/1991 | Pettigrew | 364/431.01 |
| 5,060,271 | 10/1991 | Geddes | 381/71 |
| 5,070,832 | 12/1991 | Hapka et al. | 123/198 D |
| 5,152,192 | 10/1992 | Koenig et al. | 477/120 |
| 5,157,609 | 10/1992 | Stehle et al. | 364/424.1 |
| 5,251,512 | 10/1993 | Koenig et al. | 364/424.1 |
| 5,337,629 | 8/1994 | Kita | 364/424.1 |
| 5,389,051 | 2/1995 | Hirate et al. | 364/424.1 |

FOREIGN PATENT DOCUMENTS

| | | |
|---|---|---|
| 0406615 | 1/1991 | European Pat. Off. . |
| 0471102 | 2/1992 | European Pat. Off. . |
| 0531567 | 3/1992 | European Pat. Off. . |
| 0537811 | 4/1993 | European Pat. Off. . |
| 3922051 | 1/1991 | Germany . |
| 4136613 | 5/1993 | Germany . |

OTHER PUBLICATIONS

K. Neuffer: "Elektronische Getriebesteuerung von Bosch". In: ATZ Automobiltechnische Zeitschrift 94, Sep. 1992 pp. 442–444, 446–449.

*Primary Examiner*—Kevin J. Teska
*Assistant Examiner*—Jacques Louis-Jacques
*Attorney, Agent, or Firm*—Spencer & Frank

[57] ABSTRACT

A procedure to control the drive unit in motor vehicles wherein: the maximum engine performance characteristic is determined; as a minimum engine performance characteristic, a reference performance characteristic is specified by how drive resistance depends on vehicle speed at a medium payload of the motor vehicle; above the reference performance characteristic, a first performance characteristic which is dependent on actual driving speed is defined and allocated a minimum assessment value; between this first performance characteristic and the maximum engine performance characteristic, a second performance characteristic which is also dependent on actual driving speed is defined and allocated a maximum assessment value; the current engine performance is determined; current assessment values are determined by comparing current engine performance to the first performance characteristic and the second performance characteristic; the current assessment values, as continuously determined, are filtered over time in this way, filtered assessment values are obtained; and these filtered assessment values are used to select drive unit control parameters, or parameter sets, which then are used to control the drive unit.

8 Claims, 2 Drawing Sheets

PROCEDURE FOR CONTROLLING A MOTOR VEHICLE DRIVE UNIT

BACKGROUND OF THE INVENTION

The drive unit of motor vehicles—engine and power transmission train—is increasingly subjected to regulating and control mechanisms. Using the control system of an automatic gear transmission as an example, this is to be further explained as follows: modem automatic transmission systems for motor vehicles will either be operated by means of an automatic gear shift (gear shift takes place as a function of certain input parameters, e.g. engine speed) or continuous variation (gears are shifted until the required transmission ratio has been set). Transmission control systems provided for either purpose use adaptive strategies to optimally adapt the family of gear shift characteristics (automatic gear shift) or family of control characteristics (continuously variable transmission) to the type of driver on the one hand ("long-term strategy"), or to a given environment ("medium-term strategy": for example, slip detection, towing a trailer, climbing a hill), and, finally, to the current driving situation ("short-term strategy": for example, overtaking another vehicle). By means of the long-term strategy, engine performance requirements demanded by the relevant driver are to be determined—for instance, as an average over a given time more engine performance will need to be made available to a "sporty" driver (a lot of acceleration events and high speed travel) than to an "economical" careful driver. For driver type detection, several different criteria will be used (for instance, position of drive pedal, duration and frequency of drive pedal kick-down operation, positioning speed of drive pedal) and evaluated empirically (test drives); once these have been filtered over an extended period, a numerical value is gained; this numerical value characterizes the relevant driver type. However, the disadvantage here is that these criteria for driver type detection, their evaluation, and filtering are empirical; accordingly, determining the numerical value is a very time-consuming process. And the numerical value gained in this way merely represents an indirect measure for the mean engine performance required by a given driver; thus it is not very suitable for drive unit control systems (engine control, transmission control).

SUMMARY OF THE INVENTION

The invention is based on the task of providing a simple procedure for controlling drive units in motor vehicles which avoids the above-mentioned disadvantages and features advantageous characteristics. This task is solved according to the present invention by a method for controlling a drive unit, comprised of an engine and a transmission, of a motor vehicle, which method includes the steps of: determining the speed-independent maximum engine performance characteristic ($P_{max}$); determining a reference performance characteristic ($P_{ref}$) as a minimum engine performance characteristic by the dependence of the drive resistance from the vehicle speed at a medium payload of the motor vehicle; defining a first performance characteristic ($P_E$) above the reference performance characteristic ($P_{ref}$), which first performance characteristic ($P_E$) is dependent on the actual driving speed and is allocated a minimum assessment value ($BZ_{min}$); defining a second performance characteristic ($P_S$) between the first performance characteristic ($P_E$) and the maximum engine performance characteristic ($P_{max}$), which second performance characteristic is dependent on the actual driving speed and is allocated a maximum assessment value ($BZ_{max}$); determining the current engine performance ($P_{Mot}$); continuously comparing the current engine performance ($P_{Mot}$) to the first performance characteristic ($P_E$) and to the second performance characteristic ($P_S$) to determine current assessment values ($BZ_a$); filtering the current assessment values ($BZ_a$), as continuously determined, over time to obtain filtered assessment values ($BZ_f$); using the filtered assessment values ($BZ_f$) to determine drive unit control parameters or parameter sets; and, using the determined drive unit control parameters or parameter sets to control the drive unit. Further advantageous applications of this procedure will result from relevant sub-claims.

DETAILED DESCRIPTION OF THE PREFERRED EMBODIMENT

Figure 1:
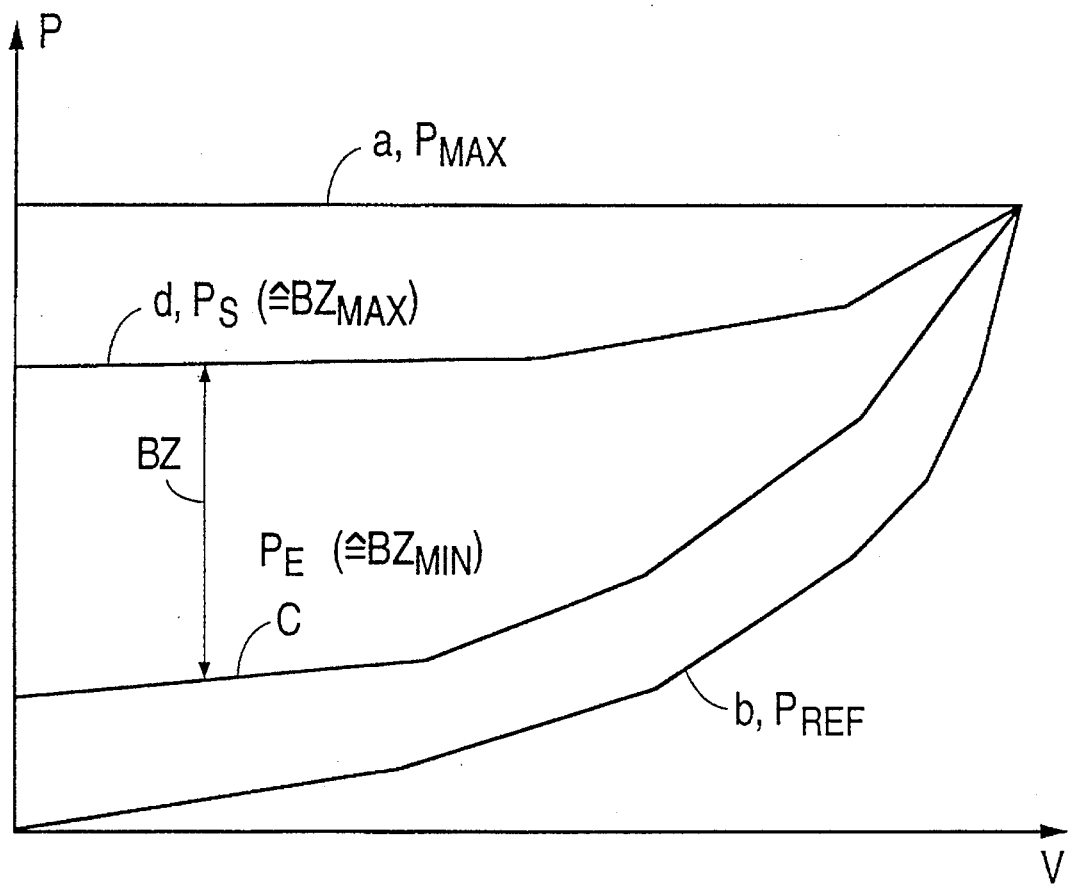
FIG. 1 is an engine performance/speed diagram for a vehicle used in explaining the present invention.
Figure 2:
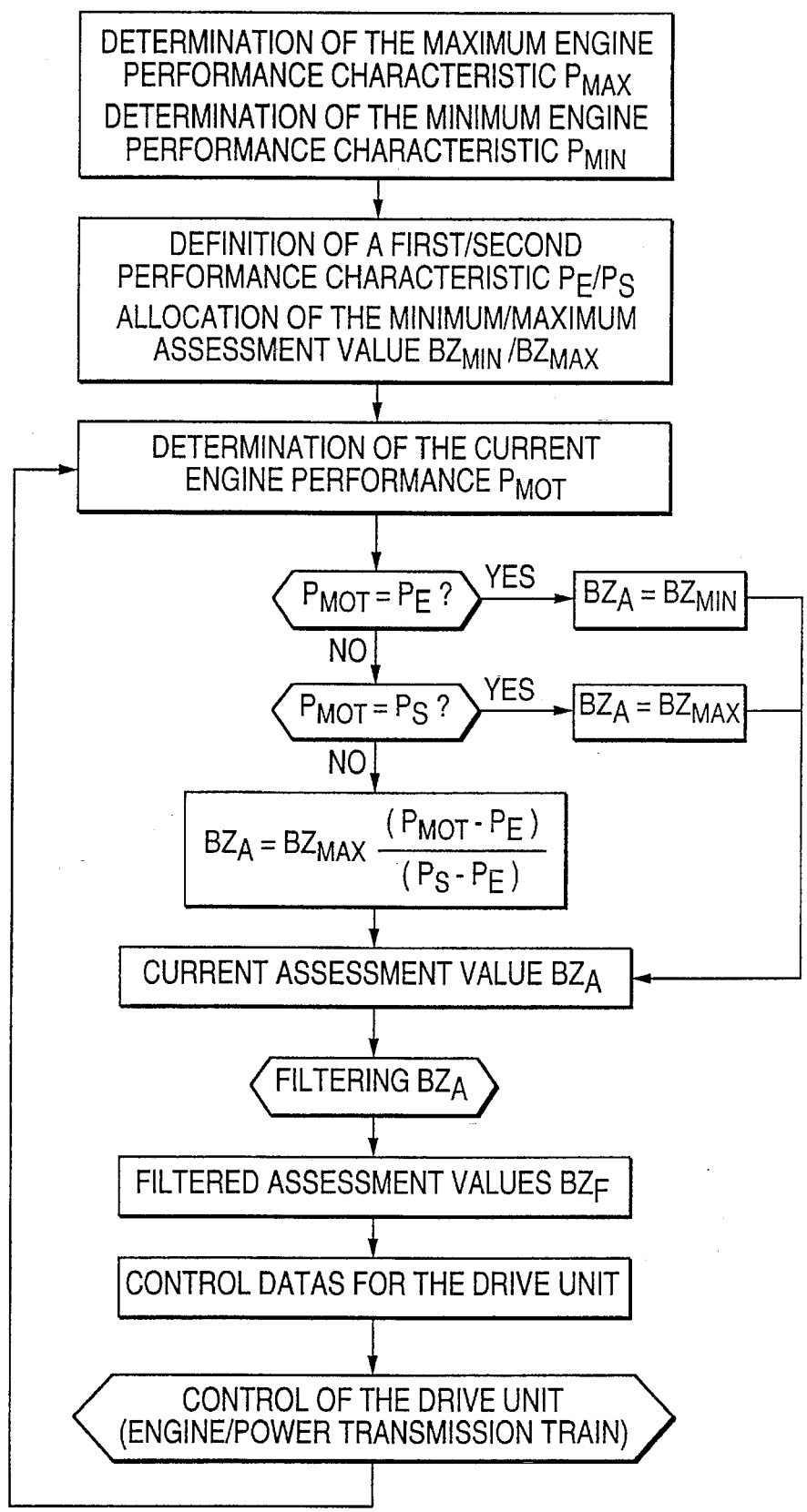
FIG. 2 is a flow diagram for the method according to the invention.

To determine a meaningful assessment value for a given drive unit control system, the following performance curves will be specified or determined and entered into the engine performance/speed diagram (p-v-diagram) shown in the Figure of the drawing:

the maximum performance $P_{max}$ (curve a) which the relevant engine can provide (independent of any speed)

as a minimum performance value (limit value between thrust and traction), the reference performance $P_{ref}$ (curve b), which reflects how drive resistance FW will be dependent on drive speed v at medium vehicle payloads ("drive resistance characteristic"):

$$P_{ref} = FW \cdot v = \frac{(A \cdot v + B \cdot v^2 + C \cdot v^3)}{n} \ ;$$

A, B, and C will be parameters specific to a given vehicle, n will be the transmission efficiency.

Depending on the relevant vehicle type as well as consumption and sportiness criteria, two speed dependent performance limit curves will be defined as characteristic $P_E$ (curve c) and $P_S$ (curve d), and entered between curves $P_{ref}$ (curve b) and $P_{max}$ (curve a). Curve c of performance characteristic $P_E$ ("Economy") will be located slightly above curve b ($P_{ref}$) and correlates to "economical" driving; this type of driving will be allocated a minimum assessment value $BZ_{min}$ (for instance, $BZ_{min}=0$). Curve d of performance characteristic $P_S$ ("Sporty") will be located slightly below curve a ($P_{max}$) and correlates to "sporty" driving; this type of driving will be allocated a maximum assessment value $BZ_{max}$ (for instance. $BZ_{max}=128$). The values selected for $BZ_{max}$ and $BZ_{min}$ will determine the number of possible intermediate values for the assessment value, and thus the precision of the following evaluation and assessment.

The current engine performance $P_{Mot}$ will be determined from current engine torque M and engine speed (current engine torque M may either be provided as a direct input value or must be determined as a family of characteristics from throttle-valve angle and engine speed. By comparing (actual) current engine performance $P_{Mot}$ to both limit curves d ($P_S$) and c ($P_E$), the current actual assessment value $BZ_a$ will be continuously determined when the vehicle is being driven (for instance, at intervals of 5 ms). To this end, one or several auxiliary characteristics may be placed between $P_E$ and $P_S$ as supporting characteristics which respectively characterize a certain type of driving; the current assessment value $BZ_a$ may then be determined by interpolation between suitable auxiliary characteristics. Alternatively, it is also possible to use linear interpolation between the two limit curves c ($P_E$) and d ($P_S$), without having to refer to supporting characteristics; in this case, the current assessment value $BZ_a$ will be determined by:

$$BZ_a = \frac{BZ_{max} \cdot (P_{Mot} - P_E)}{(P_S - P_E)}.$$

The current assessment values $BZ_a$ will be subjected to filtering over a given period of time (for instance, over a period of 5 mins); this process will yield a filtered assessment value $BZ_f$. The behaviour over time (rate of change) of assessment value $BZ_f$ can be influenced by the type of filter selected (time constant)—in particular, a given desired time dependency of assessment value $BZ_f$ may be set by specifying certain filter characteristics. Using this filtered assessment value $BZ_f$, drive unit control parameters or parameter sets (two-dimensional characteristics, three-dimensional families of characteristics) will be determined; for transmission control, e.g., the gear shift family of characteristics or family of regulating characteristics will be selected and the relevant engine speed or transmission ratio specified. Additionally, this filtered assessment value $BZ_f$ may be used to obtain information in respect of the type of driver (long-term strategy). As the assessment value obtained in this way will also include—in addition to driver type characterization—the increased performance requirement due to an increase in drive resistance,—which until now has been one of the tasks of the medium-term strategy "environment detection"—, and if slip detection is reallocated from this medium-term strategy to the short-term strategy, the criterion "environment detection" may be omitted from transmission control systems; for transmission control systems, therefore, only modified long-term and short-term strategies remain. Finally, this assessment value $BZ_f$ may even be used for an "electronic acceleration pedal", e.g., for determining torque reserve.

The procedure presented here comprises several advantages:

- it enables the current assessment value $BZ_a$ to be determined simply and easily, without any major application resources
- the filtered assessment value $BZ_f$ represents a direct measure for a driver's performance requirements and thus clearly characterizes the relevant driver type
- the behaviour over time of a control system may be predetermined by what type of filter is selected
- for transmission control systems, the medium-term stategy ("environment detection" may be omitted; only two strategies remain to be considered.

In an application example, the filtered assessment value $BZ_f$ will be used for selecting the speed-dependent family of characteristics for the transmission control system of a motor vehicle—for instance, to select the family of regulating characteristics for a continuously variable transmission (CVT). In a motor vehicle having a maximum engine performance of 128 kW (the maximum engine performance characteristic $P_{max}$ is a horizontal straight line according to the Figure) a reference performance characteristic $P_{ref}$ will be preset for a vehicle speed v between 0 km/h and 210 km/h given a payload of, for instance, 200 kg in addition to the empty weight of the motor vehicle by the equation $$P_{ref} = \frac{A \cdot v + B \cdot v^2 + C \cdot v^3}{n}$$

with the parameters A=128.99, B=1.599, C=0.02882 and a transmission efficiency n=0.9. Above the reference performance characteristic $P_{ref}$, a performance characteristic "Economy" will be defined to which a minimum assessment value $BZ_{min}=0$ is allocated; between the performance characteristic "Economy" and the maximum engine performance characteristic $P_{max}$ a "sporty" performance characteristic will be defined to which the maximum assessment value $BZ_{max}=128$ is allocated. The current assessment values will be continuously determined while the vehicle is being driven, e.g., at intervals of 5 ms as a function of the current engine performance $P_{Mot}$; for example, given a current engine performance $P_{Mot}$ of 74 kW (in the case of a linear interpolation) this will result in a current assessment value $BZ_a=70$. The current regulating family of characteristics and thus the setting of the engine speed will be selected using the filtered assessment value $BZ_f$, which will be obtained by filtering the actual assessment values $BZ_a$. If, for instance, it is desired to preset a more "economical" than "sporty" type of driving (remain for as long as possible within the economy range E, remain for as short as possible within the sporty range S), this filtering may, for instance, look as follows: if the current assessment value $BZ_a$ increases or remains the same, this will cause the filtered assessment value $BZ_f$ to increase exponentially over time (i.e., driving type characteristics will change, first slowly, then ever faster, from "E" to "S"); if the current assessment value $BZ_a$ decreases, this will cause the filtered assessment value $BZ_f$ to decrease linearly following a preset delay period (i.e., driving type characteristics will change from "S" to "E").

What is claimed is:

1. A method for controlling a drive unit, comprised of an engine and a transmission, of a motor vehicle including the following steps:

a) determining the speed-independent maximum engine performance characteristic ($P_{max}$);

b) determining a reference performance characteristic ($P_{ref}$) as a minimum engine performance characteristic by the dependence of the drive resistance from the vehicle speed at a medium payload of the motor vehicle;

c) defining a first performance characteristic ($P_E$) above the reference performance characteristic ($P_{ref}$), which first performance characteristic ($P_E$) is dependent on the actual driving speed and is allocated a minimum assessment value ($BZ_{min}$);

d) defining a second performance characteristic ($P_S$) between the first performance characteristic ($P_E$) and the maximum engine performance characteristic ($P_{max}$), which second performance characteristic is dependent on the actual driving speed and is allocated a maximum assessment value ($BZ_{max}$);

e) determining the current engine performance ($P_{Mot}$);

f) continuously comparing the current engine performance ($P_{Mot}$) to the first performance characteristic ($P_E$) and to the second performance characteristic ($P_S$) to determine current assessment values ($BZ_a$);

g) filtering the current assessment values ($BZ_a$), as continuously determined, over time to obtain filtered assessment values ($BZ_f$);

h) using the filtered assessment values ($BZ_f$) to determine drive unit control parameters or parameter sets; and, i) using the determined drive unit control parameters or parameter sets to control the drive unit.

2. Procedure in accordance with claim 1, wherein, as said first performance characteristic, an economy performance characteristic ($P_E$), and, as said second performance characteristic, a sportive performance characteristic ($P_S$) are defined in relation to vehicle type, consumption criteria, and efficiency criteria.

3. Procedure in accordance with claim 2, wherein said current assessment values ($BZ_a$) are determined by interpolating between the maximum assessment value ($BZ_{max}$) and the minimum assessment value ($BZ_{min}$).

4. Procedure in accordance with claim 2, wherein at least one more performance characteristic is defined between the first performance characteristic ($P_E$) and the second performance characteristic ($P_S$), and wherein current assessment values ($BZ_a$) are determined by using these additional performance characteristics.

5. Procedure in accordance with claim 1, wherein the behaviour over time when filtering current assessment values ($BZ_a$) is preset in relation to the desired type of driving (S, E).

6. Procedure in accordance with claim 1, wherein characteristics or families of characteristics are determined as parameter sets for drive unit control.

7. Procedure in accordance with claim 6, wherein families of characteristics dependent on current engine speed are used as parameter sets for transmission control.

8. Procedure in accordance with claim 6, wherein families of characteristics dependent on current transmission ratios are used as parameter sets for transmission control.

\* \* \* \* \*